United States Patent
Sasson et al.

(10) Patent No.: US 10,831,388 B2
(45) Date of Patent: Nov. 10, 2020

(54) SELECTIVE DATA DESTRUCTION VIA A SANITIZING WIPE COMMAND

(71) Applicant: International Business Machines Corporation, Armonk, NY (US)

(72) Inventors: Ben Sasson, North Baddesley (GB); Miles Mulholland, Chandlers Ford (GB); Lee Jason Sanders, Chichester (GB); Gordon Douglas Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/276,999

(22) Filed: Feb. 15, 2019

(65) Prior Publication Data

US 2020/0264791 A1    Aug. 20, 2020

(51) Int. Cl.
*G06F 3/06* (2006.01)
*G06F 12/02* (2006.01)

(52) U.S. Cl.
CPC .......... *G06F 3/0641* (2013.01); *G06F 3/0617* (2013.01); *G06F 3/0683* (2013.01); *G06F 12/023* (2013.01); *G06F 2212/7205* (2013.01)

(58) Field of Classification Search
CPC .... G06F 3/0641; G06F 3/0683; G06F 3/0617; G06F 12/023; G06F 2212/7205
USPC ......... 707/664, 692, 648; 711/154, 170, 103
See application file for complete search history.

(56) References Cited

U.S. PATENT DOCUMENTS

| | | | |
|---|---|---|---|
| 8,682,868 B2 | 3/2014 | Ghuge et al. | |
| 9,430,164 B1 | 8/2016 | Botelho et al. | |
| 9,432,192 B1 | 8/2016 | Pogde et al. | |
| 2002/0078026 A1* | 6/2002 | Fergus | G06F 3/0622 |
| 2008/0178300 A1* | 7/2008 | Brown | H04L 63/101 726/29 |
| 2014/0344571 A1* | 11/2014 | Adam | H04L 63/0428 713/165 |
| 2015/0143063 A1 | 5/2015 | Mutalik et al. | |
| 2016/0127327 A1* | 5/2016 | Mehta | H04L 63/0428 713/168 |
| 2018/0129446 A1* | 5/2018 | Griffes | H04L 9/0891 |
| 2018/0341773 A1* | 11/2018 | Khatri | H04L 9/002 |
| 2020/0004453 A1* | 1/2020 | Rori | G06F 3/0604 |

OTHER PUBLICATIONS

Fisher, T., "40 Free Data Destruction Software Programs," Lifewire, Feb. 4, 2019, 44 pages. https://www.lifewire.com/free-data-destruction-software-programs-2626174.

Fisher, T., "DoD 5220.22-M Data Wipe Method [US DOD Wipe Standard]," Lifewire, Dec. 16, 2018, 3 pages. https://www.lifewire.com/dod-5220-22-m-2625856.

* cited by examiner

*Primary Examiner* — Hong C Kim

(74) *Attorney, Agent, or Firm* — Jorge R. Maranto

(57) ABSTRACT

A method and a system for permanently deleting data from storage. The method includes receiving a wipe command to permanently delete a data segment stored in a storage system. The data segment includes an address to blocks where the data of the data segment is stored. The method also includes sanitizing the data segment, marking the address as sanitized, locating a last journal entry in a journal. The last journal entry includes metadata regarding the data segment. The method also includes sanitizing the last journal entry, traversing the journal, and sanitizing each journal entry of the data segment.

20 Claims, 5 Drawing Sheets

SELECTIVE DATA DESTRUCTION VIA A SANITIZING WIPE COMMAND

BACKGROUND

The present disclosure relates to selective data destruction, and more specifically, to data destruction performed on a storage system.

Permanently deleting data from storage is becoming increasingly more difficult as storage solution technology advances. Modern storage systems allow data to be prioritized, centralized, and remotely managed all while implementing data reduction techniques to preserve storage capacity. Data reduction techniques attempt to reduce or transform data down to the essential components. Examples of data reduction techniques include data compression, deduplication, and thinning volumes. However, these technological advances tend to leave behind data remnants once data is deleted. For example, journal entries, metadata, redundancies in storage, and various other remnants allow deleted data to be recovered once it has been deleted.

SUMMARY

Various embodiments are directed to a method of permanently deleting data segments. The method includes receiving a wipe command, from a host, to permanently delete a data segment stored in a storage system. The data segment includes an address to storage blocks where the data segment is stored in the storage system. The method also includes sanitizing the data segment and marking the address to the storage blocks as sanitized. The method can also include locating a last journal entry that was entered for the data segment in a journal used by the storage system. The last journal entry includes metadata regarding the data segment. The method also includes sanitizing the last journal entry once it has been located. The sanitization prevents the use of the journal to be used as a recovery tool. The method also includes traversing the journal to locate any previous journal entry regarding the data segment and sanitizing those journal entries if they exist.

Further embodiments are directed to a computer program product for permanently deleting data segments, which can include a computer readable storage medium having program instructions embodied therewith, the program instructions executable by a processor to cause the device to perform operations. The operations include receiving a wipe command, from a host, to permanently delete a data segment stored in a storage system. The data segment includes an address to storage blocks where the data segment is stored in the storage system. The operations also includes sanitizing the data segment and marking the address to the storage blocks as sanitized. The method can also include locating the last journal entry that was entered for the data segment in the journal used by the storage system. The last journal entry includes metadata regarding the data segment. The operations also include sanitizing the last journal entry once it has been located. The sanitization prevents the use of the journal to be used as a recovery tool. The operations also include traversing the journal to locate any previous journal entry regarding the data segment and sanitizing those journal entries if they exist.

Additional embodiments are directed to a system, which can include at least one processing component and at least one memory component. The memory component is configured to store instruction, which when executed from the memory, cause the processing component to perform operations on the system. The operations include receiving a wipe command, from a host, to permanently delete a data segment stored in a storage system. The data segment includes an address to storage blocks where the data segment is stored in the storage system. The operations also include sanitizing the data segment and marking the address to the storage blocks as sanitized. The operations can also include locating a last journal entry that was entered for the data segment in a journal used by the storage system. The last journal entry includes metadata regarding the data segment. The operations also include sanitizing the last journal entry once it has been located. The sanitization prevents the use of the journal to be used as a recovery tool. The operations also include traversing the journal to locate any previous journal entry regarding the data segment and sanitizing those journal entries if they exist.

BRIEF DESCRIPTION OF THE DRAWINGS

These and other features, aspects, and advantages of the embodiments of the disclosure will become better understood with regard to the following description, appended claims, and accompanying drawings where:

Figure 1:
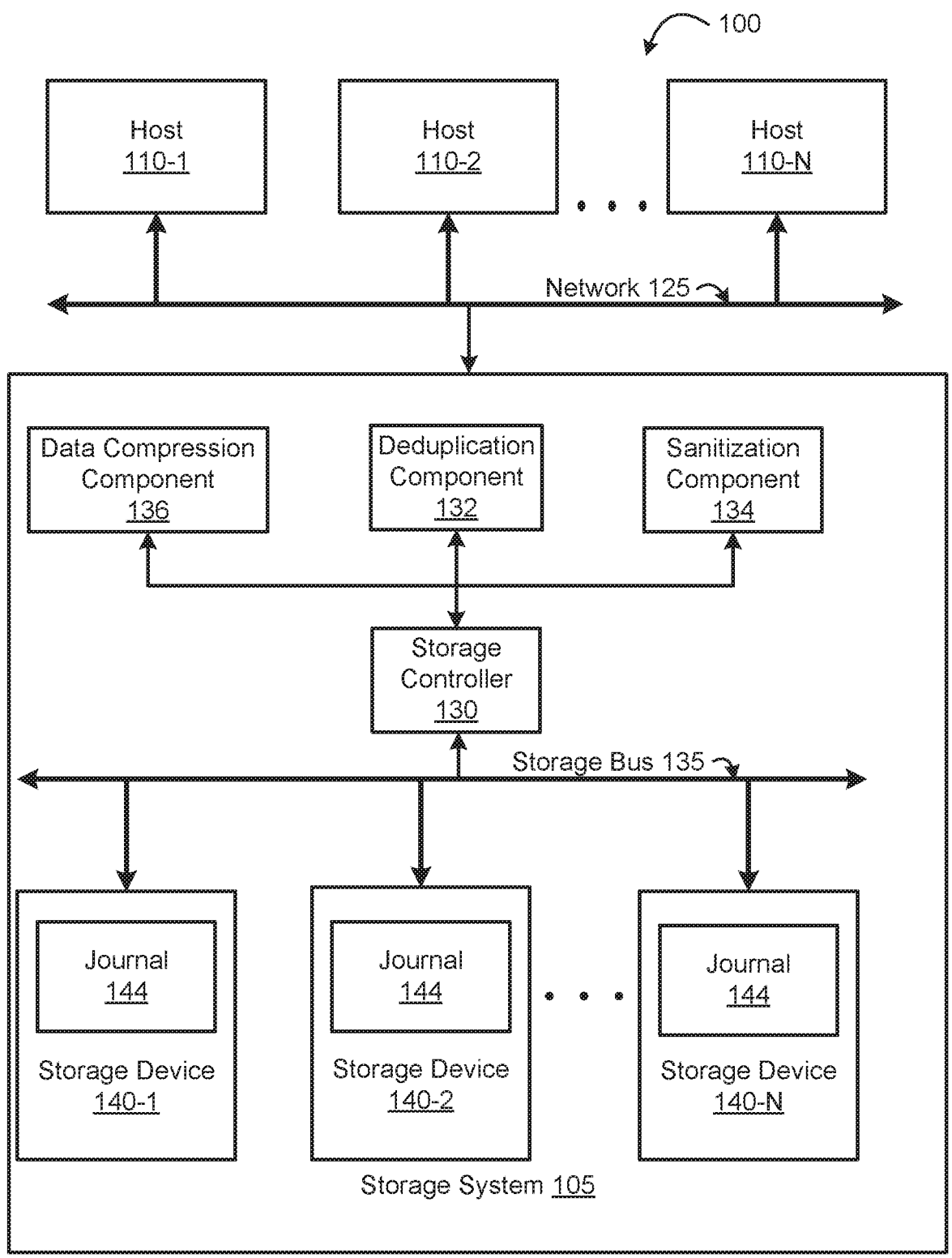
FIG. 1 is a diagram of a tiered overview of a storage system that connects multiple hosts to multiple storage devices, according to embodiments of the present disclosure.

While the disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the disclosure. Like reference numeral are used to designate like parts in the accompanying drawings.

DETAILED DESCRIPTION

Permanently deleting data is becoming increasingly more difficult as storage environment technologies evolve. Deleted data can, at times, be salvaged because the deletion command does not thoroughly format the physical location of the stored data. The data may also be stored in multiple locations that may not necessarily be formatted when the deletion command is received. How a deletion occurs can also vary depending on a storage solution configuration, with several storage solutions configured to cater to the specific needs of an individual, business, or service provider. One such storage solution is a storage area network (SAN). Storage area networks have become increasingly more popular as businesses take advantage of SAN's ability to operate as a single storage solution that is customizable and expandable. However, the complexity of SANs, as well as other storage solutions, makes permanently deleting data more difficult. Data that is perceived as deleted, inaccessible, lost, corrupted, or damaged can often be recovered through data recovery techniques that utilize clues left by the data.

Various data deletion techniques attempt to permanently delete data from storage. However, these techniques attempt at permanent deletion leave behind data remnants that advanced data forensics can utilize to recover the data that has been deleted. A data remnant is information that can be accessed to recover and restore data that has been deleted. This is particularly true when the data is stored in a data solution environment such as an SAN. SANs typically implement data reduction techniques to improve system performance and increase storage space. Reduction techniques include techniques such as compression, reallocation, and data deduplication. As a result of such techniques, remnants of the data are created when the data is written, moved, or manipulated in any way. Examples of some such data remnants include journal entries, metadata, and uncollected data marked for garbage collection.

Some storage systems write data in a particular way that is also creates data remnants. In some systems, data is written in a write-forward fashion. In that, the new data that is written is appended to the end of a write array. For example, a log structured array appends new data to the end of the array. When the data is overwritten, the old location is simply marked as "free." New writes append to the end of allocated space even if the data already exists, and even if the write is an over-write. The new data is not written in place. Rather, the new write is appended at the end. The old location where the data was previously stored still contains the data but waits for garbage collection to reallocate that space.

Disclosed herein is a method and a system for an improved data deletion technique that permanently destroys data. The disclosure provides a means for permanently deleting data specified by a host by removing data remnants created by storage solutions. Also, by providing a means for hosts to permanently delete potentially sensitive information, system security is also improved. Security is increased because the deleted information is unable to be recovered by possible nefarious actors.

FIG. 1 is a block diagram illustrating a system 100, according to one embodiment of the disclosure. The system 100 includes, but is not limited to one or more hosts 110-1, 110-2, 110-N (collectively "host 110"), a network 125, and a storage system 105. The host 110 is communicatively coupled to the storage system 105 over the network 125. The storage system 105 includes a storage controller 130, a storage bus 135, and one or more storage devices 140-1, 140-2, 140-N (collectively "storage device 140"). The storage controller 130 is communicatively coupled with the storage device 140 over the storage bus 135. In some embodiments, the storage system 105 includes a deduplication component 132, a sanitization component 134, a data reduction component 136, and a journal 144.

The storage system 105 is a component of system 100 configured to consolidate, manage, and operate data storage. In some embodiments, storage system 105 is a server or an aggregation of servers. Examples of the storage system 105 include storage servers (e.g., block-based storage), direct attached storage, file servers, server-attached storage, network-attached storage, or any other storage solution. In some embodiments, the components of the storage system 105 are implemented within a single device. In some other embodiments, the components of the storage system 105 comprise of a distributed architecture. For example, the storage system 105 can comprise of multiple storage devices 140 that are physically located at different locations but are able to communicate over a communication network to achieve a desired result.

The host 110 is a component of system 100 configured to provide data and commands to the storage system 105. In some embodiments, the host 110 is a server (e.g., Windows, Power Systems, IBM I, UNIX, and System Z), a personal computer (e.g., desktop, laptop, and tablet), or any device capable of communicating over a network. The data can be manipulated in a variety of ways such as reading, writing, deleting, and moving the data. To accomplish this, commands are sent by the host 110 to the storage system via SCSI commands, in some embodiments.

The network 125 is a component of system 100 configured to facilitate direct, high-speed data transfers and communication between the host 110 and the storage system 105. Examples of the network 125 include a local area network (LAN), a wide area network (WAN), a storage area network (SAN), intranet, or any combination thereof.

The storage controller 130 is a component of storage system 105 configured to manage the input and output of data from the network 125 to the storage device 140. Data can be stored and manipulated depending on the needs of the system. In some embodiments, the storage controller arranges and configures the storage devices 140 in a redundant array of independent disks (RAID) configuration. For example, data stored within the storage system 105 can be striped across all configured storage devices 140. Various RAID configurations also offer techniques such as striping, mirroring, and providing parity bits of data. The storage controller 130 is also configured to manage how the data, received by the storage system 105, is stored and retrieved. For example, in tier-based storage configurations, data is placed in storage devices 140 best suited for the type of data that is received.

The deduplication component 132 is a component of storage system 105 configured to identify unique chunks of data, or byte patterns, and stores a signature of the chunk for reference when writing new data chunks. If the signature of the chunk matches an existing signature, the new chunk is replaced with a reference that points to the stored chunk. The same byte pattern might occur many times resulting in the amount of data that is stored being greatly reduced. In some embodiments, 256 KB blocks are identified and written to storage. In some other embodiments, 8 KB chunks are identified, compressed, and written to storage.

When a matching signature is located by the deduplication component 132, metadata is created, or updated, that points the metadata to the existing copy of the data. This allows the storage system 105 to locate the data as well as to locate any possible duplicates.

The sanitization component 134 is a component of storage system 105 configured to delete data stored on the storage system 105. The sanitization component 134 can delete data in a variety of ways. For example, the sanitization component 134 can overwrite data with a random, instead of static, pattern of bits. Each sector of storage will contain different data. Other deletion techniques that can be performed by the sanitization component 134 include multiple overwrites of the data, firmware level deletion, overwrites using is, Os, and random characters. In some embodiments, the sanitization component 134 deletes data based on a data wiping standard. For example, the wiping standard can be DoD 5220.22-M ECE, CESG CPA, BSI-GSE, NCSC-TG-025, and any other known data wiping standard.

The data compression component 136 is a component of storage system 105 configured to compress data stored on the storage volumes of the storage devices 140. The data compression component 136 is configured to compress data located at a physical address within the storage system 105.

The compression of data allows for physical space on the storage to be freed up for other use. The data compression component 136 can also be configured to perform an address translation of the compressed data as well as a space translation. A translation to physical address may be necessary for the execution of the data when it is accessed. The address translation maps the virtual address of the compressed data to the physical address of the compressed data. Also, a space translation is required for to decompress the data when it is accessed. The space translation provides for physical space on the storage system 105 for the decompression of the data.

The storage bus 135 is a component of storage system 105 configured to facilitate direct, high-speed transfer and communication between the storage devices 140, either directly or through the storage controller 130. In some embodiments, the storage bus 135 is an internal bus. In some other embodiments, the storage bus 135 is an external bus. The storage bus 135 enables data to be moved without server intervention, therefore freeing up processing cycles on the server end. For example, a disk device can back up its data to a tape device as needed without receiving a command from a server or controller. Examples of the storage bus 135 include a LAN, a WAN, a Fibre Channel (FC), and any combination thereof. In some embodiments, implementations interconnect together into many network configurations capable of communicating over long distances. The storage bus 135 is configured to transfer data utilizing a variety of standards. Some standards include the Small Computer System Interface (SCSI), Fibre Channel, fiber connection (FICON), and Internet Protocol (IP) standards.

The storage device 140 is a component of storage system 105 configured to store and manage a portion of the input and output of data on the storage system 105. This configuration can assist with the integration of the storage device 140 with other such devices. Examples of storage devices include tape systems (e.g., tape drives, tape autoloaders, tape libraries), disk systems, storage arrays, magnetic drives, solid-state drives, and optical drives. In some embodiments, the storage device includes a journal 144.

The journal 144 is a component of storage system 105 configured to store information on the data that is stored within the storage system 105. The journal 144 can be located, but is not limited to, at least one storage device 140. In some embodiments, a journal entry is created when data is written, read, deleted, or moved. For example, the storage system 105 can create a journal entry of the location where a particular piece of data is stored and what type of content is contained within the data. To prevent outside access to the journal 144, some embodiments encrypt the journal 144. In some embodiments, the journal is stored outside of the storage system 105 and is accessed over the network 125.

Figure 2A:
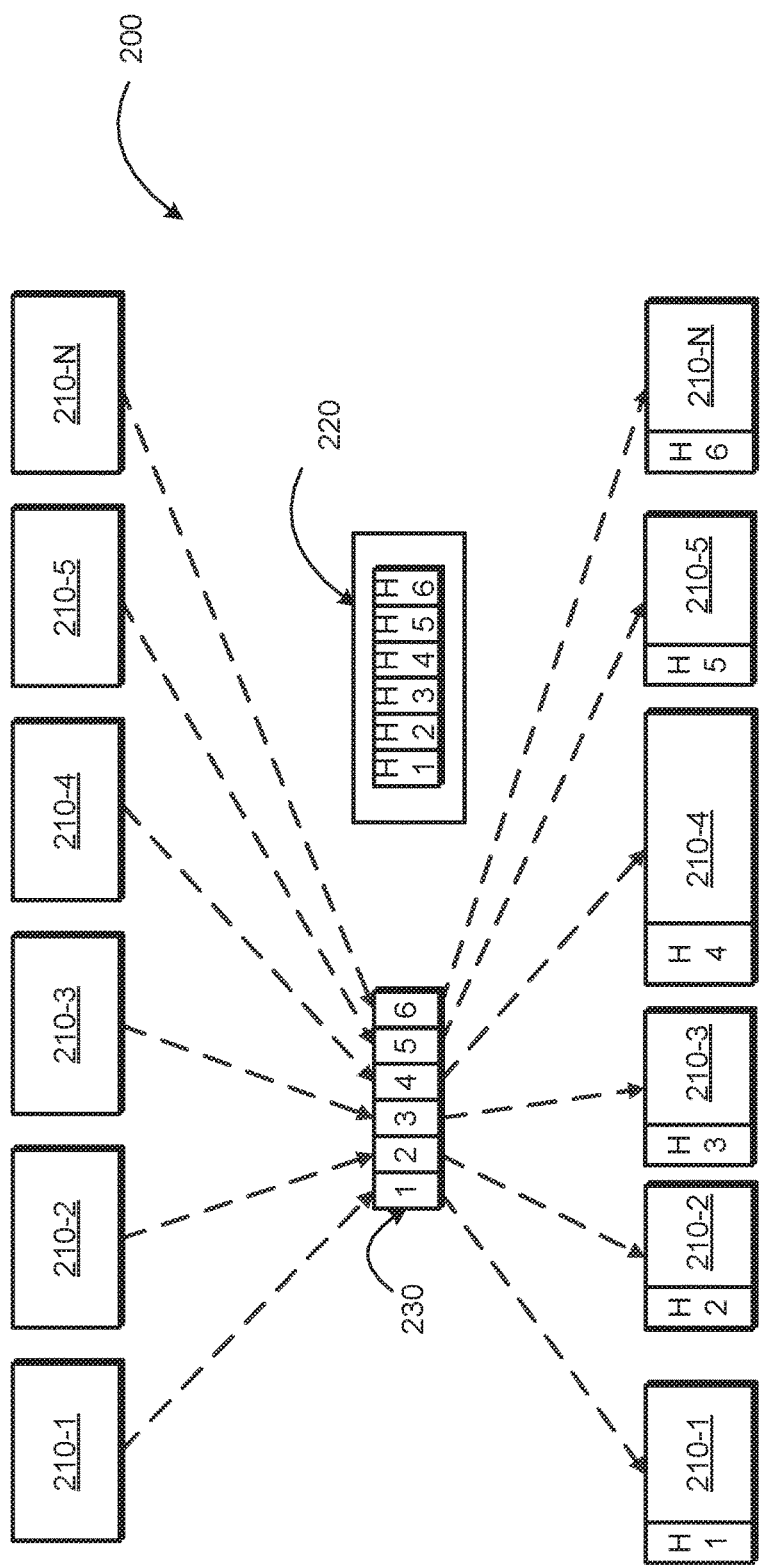
FIG. 2A is a diagram of a gathered-write implementation, according to embodiments of the present disclosure.

FIG. 2A is a block diagram illustrating a diagram 200 of an array of data segments being written to storage, according to embodiments of the disclosure. The diagram 200 includes data segments 210-1, 210-2, 210-3, 210-4, 210-5, 210-N (collectively "data segment 210"), journal entry 220 illustrated by blocks H1-H6, and physical address 230 illustrated by block 1-6. A gathered-write architecture allocates data sequentially and provides a journal entry that provides a lookup to match the block address with the physical address within the architecture.

The data segments 210 are gathered in an array. Once the array is prepared to write to the physical address 230, the location of the data segments is written to the journal 220. This is illustrated by the journal entry for each data segment 210 having a corresponding journal number that matches the physical address where it is written. In some embodiments, the data segments are compressed as they are written on to a physical address to reduce the overall space needed to store the data segment. For example, data segment 210-1 may have no compression while data segment 210-2 may be compressed.

Figure 2B:
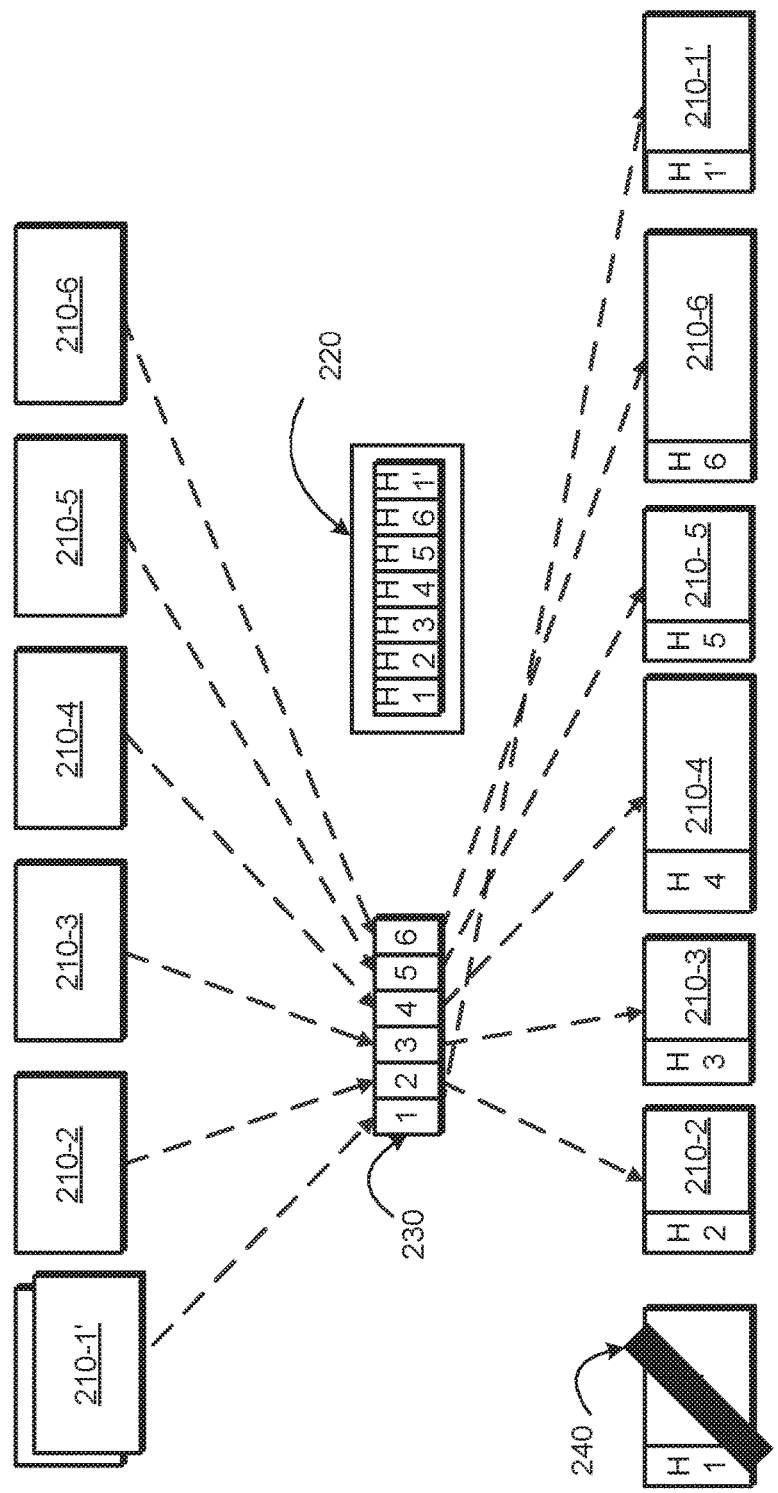
FIG. 2B is a diagram of an overwrite command of a gathered-write implementation, according to embodiments of the present disclosure.

FIG. 2B is a block diagram illustrating an overwrite command on the data segments of diagram 200, according to embodiments of the present disclosure. The diagram additionally includes data segment 210-1' and free marker 240. Traditional in-place architecture will overwrite data using the same physical address as the data that is being overwritten. For example, if a data segment 210 is overwritten with a series of random numbers, the system will overwrite the physical address where the data segment 210 is located with random numbers. As previously discussed, using gathered-write architecture, the overwrite command of a data segment will produce new data created at the end of the write array where free space is located. Data segment 210-1' is an overwrite command intending to overwrite data segment 210-1. The overwrite command appends the data to the end of the array where unused storage is located and marks the old physical location of 210-1 with the free marker 240. The free marker acts as an indicator that the location requires garbage collection and can also inform the system that the location is no longer needed and free to be reallocated as available storage. Also, a new journal entry is added to the journal 220 reflecting the location of the physical address where the data segment 210-1' is located. To note, the journal entry indicating where 210-1 is still present in the journal 220. Data forensics need only to access the journal to discover the location of 210-1 and retrieve that stored information. The overwrite command did not physically overwrite the data because it simply was created at the end of the available space in the system. The present disclosure presents a method and system for permanently deleting data that may be stored in such a manner.

Figure 3:
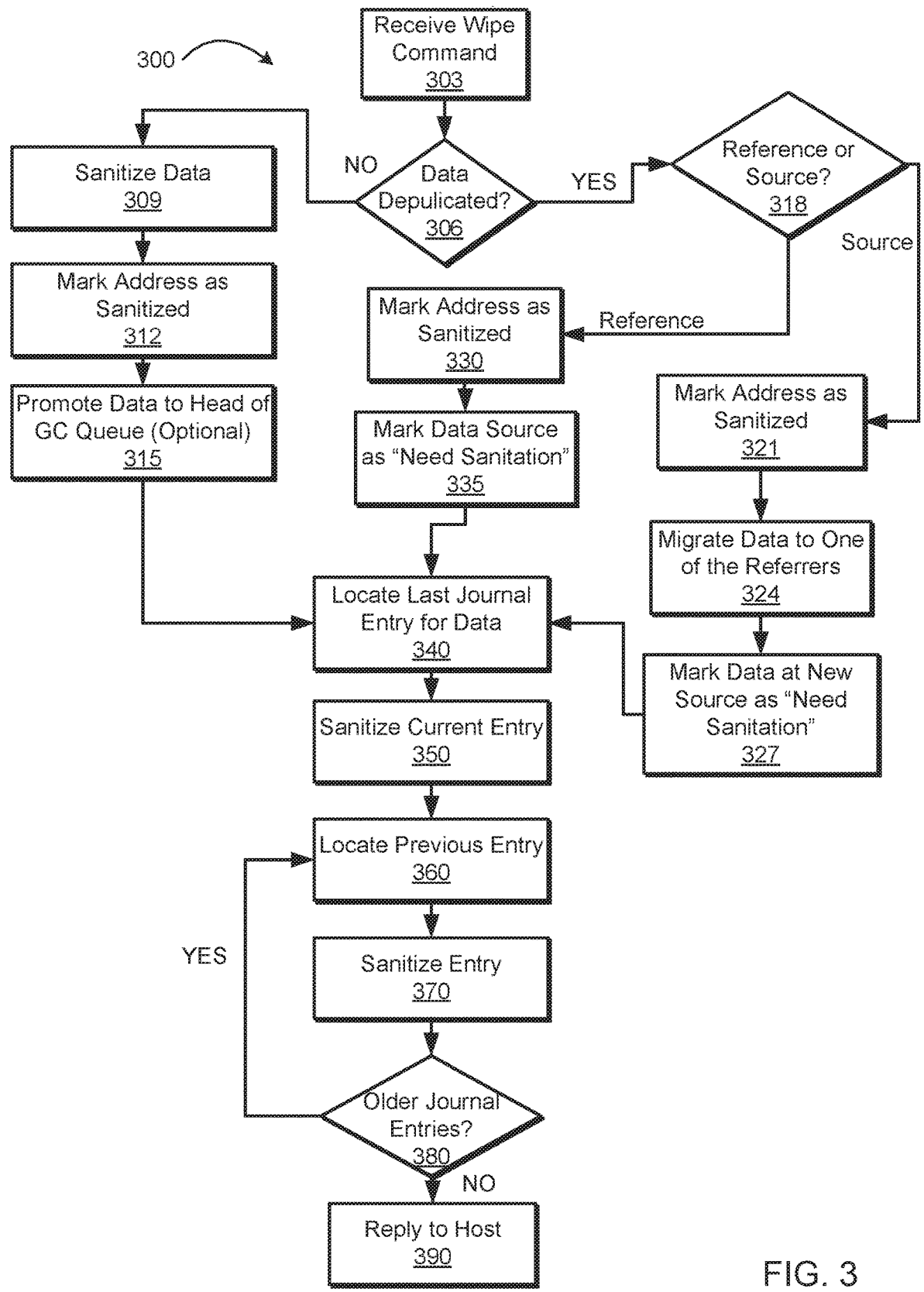
FIG. 3 is a flow diagram illustrating a process of permanently deleting data from a storage system, according to embodiments of the present disclosure.

FIG. 3 is a flow diagram illustrating a process 300 of permanently deleting data from a storage system, according to some embodiments of the present disclosure. To illustrate process 300, but not to limit embodiments, FIG. 3 is described within the context of system 100 of FIG. 1. Where elements described with respect to FIG. 3 are identical to elements shown in FIG. 1, the same reference numbers are used in both Figures.

A wipe command is received by the storage system 105 from a host 110. This is illustrated at step 303. The wipe command informs the storage system 105 that a data segment stored on the storage system 105 requires permanent deletion. In some embodiments, the wipe command is a separate command that is sent by a host 110 or other system. In some other embodiments, the wipe command is attached to another command. For example, the wipe command can be a SCSI tag attached to an overwrite command. The wipe command can include information on the data segment that is to be deleted, the type of deletion to be performed (e.g., multiple pass, random number, and all 0s write over), and when the deletion is to occur.

The wipe command can be sent using a variety of protocols. For examples, the command can be sent using SCSI, FCP, FC, iSCSI, and other available communication protocols capable of transmitting commands over a bus.

The deduplication component 132 then determines whether the data segment received the wipe command is deduplicated. This is illustrated at step 306. A determination into whether the data segment has been deduplicated is required because of how deduplicated data is handled in a storage system. Deduplicated data may not be physically stored at the physical location where the data segment points to. In some embodiments, the data segment is a reference to a source of data that is located at a separate location. In some other embodiments, the data segment is a source that has references pointing to, and relying on, the data located at the source.

If the deduplication component 132 determines that the data segment received has not been deduplicated, the sanitization component 134 can sanitize the data segment. This is illustrated at step 309. The sanitization of the data can be dependent on the level of sanitization requested by the host 110 or is defaulted by the storage system 105. In some embodiments, the host 110 dictates the type of sanitization that is to be performed by the sanitization component 134 within the wipe command that is received. For example, the sanitization component 134 may perform a DoD 5220.22-M ECE wipe standard that is requested in the wipe command.

To indicate that the data segment has been sanitized, the process 300 proceeds by marking the address location of the data segment as sanitized. This is illustrated at step 312. The address mark is an indicator that informs the storage system 105 that the data stored at that address has been sanitized. The marking can be accomplished by providing a SCSI flag that is read when attempting to access data from that address location. Other approaches that provide indications regarding addresses can also be used. In some embodiments, the address is marked as sanitized prior to the sanitization step 309. For example, the process 300 can mark the address location as sanitized and then proceed with sanitizing the data segment.

In some embodiments, the storage system 105 will automatically return a zero-buffer response when the address location, marked as sanitized, is accessed. Other types of responses can include random unreadable data or intentionally unstable data that prevents access to the address location. The random data return prevents the data segment from being read and prohibits would-be attackers from attempting to retrieve the data segment from the address location.

Once the data segment has been sanitized and marked as sanitized, the process 300 proceeds by promoting the address location of the data to the head of the garbage collection queue. This is illustrated at step 315. Promoting the address location to the head of the garbage collection queue allows the storage system 105 to deallocate the storage space and return it to available space as quickly as possible. In some systems, garbage collection is not frequently performed and the longer the data segment resides in the system as occupied, the higher the risk that the data can be retrieved and possibly recovered. In some embodiments, promoting the address location to the head of the garbage collection queue is unnecessary as the system provides for efficient garbage collection.

If the deduplication component 132 determines that the data segment received has been deduplicated, the deduplication component 132 then determines whether the data segment received is a reference address location or a source address location. This is illustrated at step 318. In a deduplicated system, a reference address location merely points to the source address where the actual data is stored. A source address location contains the stored data but may have references pointing to that location that still require the information.

If the deduplication component 132 determines that the data segment received is a reference address location, the sanitization component 134 will mark the address as sanitized. This is illustrated at step 330. By marking the address as sanitized, the reference address location is detached from the source address location and is no longer able to retrieve the data that is located at the source because the pointer is eliminated. In some embodiments, the sanitization marker is similar to the mark used at step 312. In some embodiments, the storage system 105 will automatically return a zero-buffer response when the address location that is marked as sanitized has been accessed. Other types of responses can include random unreadable data or intentionally unstable data that prevents access to the address location.

In conjunction with marking the reference address as sanitized, the sanitization component will mark the source address indicating that the source address requires sanitization once all references are eliminated. This is illustrated at step 335. As other reference address locations require the data at the source address location, deleting the source data would destabilize the storage system 105. In some embodiments, the source address need not be marked as sanitized because it has already been previously marked as sanitized.

If the deduplication component 132 determines that the data segment received is a source address location, the sanitization component 134 will mark the address as sanitized. This is illustrated at step 321. The marker indicates that the address location is no longer able to be read, and that the data segment is sanitized. In some embodiments, the sanitization marker is similar to the mark used at step 312. In some embodiments, the storage system 105 will automatically return a zero-buffer response when the address location that is marked as sanitized has been accessed. Other types of responses can include random unreadable data or intentionally unstable data that prevents access to the address location.

The data that is stored at the address location marked for sanitization is migrated by the storage controller 130 to a reference address location pointing to the source address location. This is illustrated at step 324. The deduplication component 132 determines the references, if any, that are pointing to the source address location. Upon determining all references, the address location of one of the references is used as the new source address location. The data of the original source address location is migrated to the new source address location. The other references, if any, are redirected to the new source address location. This allows for the references to still access the data that the original source address contained.

In some embodiments, each reference address pointing to the source address is marked as requiring sanitization. By marking the references, the storage system 105 can inventory and trace all references to sensitive data. If necessary, the storage system 105 can sanitize all references to ensure that the sensitive data is destroyed completely.

Upon migrating the data from the original source address location, to the new source address location, the sanitization component 134 marks the new address location as requiring sanitization. This is illustrated at step 327. By marking the new source address location, the storage system 105 can sanitize the new source address location once all references to the address have been eliminated and the data is no longer needed.

The process 300 proceeds by locating the last journal entry, in the journal 144, for the data segment that received the wipe command. This is illustrated at step 340. The storage controller 130 locates the journal 144 and searches the journal for the latest entry of the data segment. A journal entry can be any information relating to the data segment. For example, a journal entry can indicate that data has been migrated from one address location to another address location. It can also indicate that the data has been transferred to a different storage device 140. A journal entry can be used to locate and trace the prior locations data has been stored. The ability to use the journal to retrieve deleted data can cause vulnerability to the storage system. As such, the journal entries of sensitive data need to be located and deleted. In some embodiments, the journal 144 is located outside of the storage system 105 and is accessed remotely. In other embodiments, the journal 144 is encrypted and requires decryption by the storage controller 130.

Once the storage controller 130 locates the latest journal entry for the data segment, the sanitization component 134 sanitizes and deletes the journal entry from the journal 144. This is illustrated at step 350. Similar to step 309, the sanitization of the data can be dependent on the level of sanitization requested by the host 110 or storage system 105. In some embodiments, the entire journal is deleted and marked as sanitized.

To ensure that all journal entries for the data segment are deleted and sanitized, the process 300 proceeds with an iterative process of traversing the journal 144. The storage controller begins by locating, if any, a previous journal entry for the data segment. This is illustrated at step 360. In some instances, data can be migrated multiple times to suit the needs of the storage system 105. For example, data may be migrated from one storage device to another device because of a drive failure or to alleviate capacity concerns. Data can also be migrated to different storage devices based on the type of data that is stored. There are numerous reasons why data is transferred. Journal entries are recorded into the journal 144 each time the data is manipulated in such a manner. To permanently delete the data segment, each journal entry of the data segment requires sanitization.

If a previous journal entry is located, the sanitization component 134 sanitizes the journal entry. This is illustrated at step 370. The process 300 proceeds by repeating steps 360 and 370. This is illustrated at step 380. The process continues until no journal entries are located in the journal 144. After all journal entries have been sanitized, the process 300 replies to the host that the data segment has been sanitized and the process is complete. This is illustrated at step 390.

Figure 4:
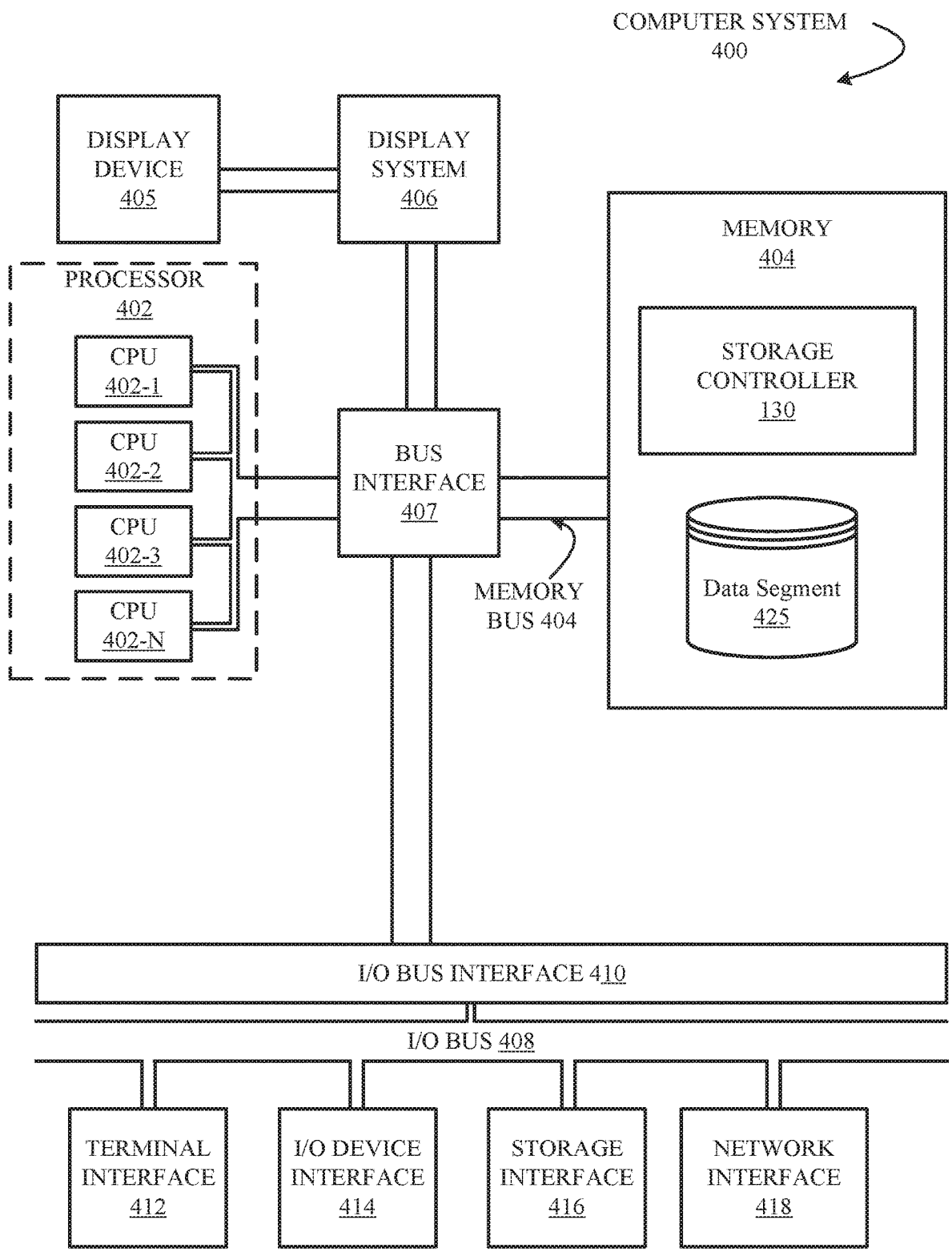
FIG. 4 is a block diagram illustrating a computer system, according to embodiments of the present disclosure.

FIG. 4 is a high-level block diagram illustrating an exemplary computer system 400 that can be used in implementing one or more of the methods, tools, components, and any related functions described herein (e.g., using one or more processor circuits or computer processors of the computer). In some embodiments, the major components of the computer system 400 comprise one or more processors 402, a memory subsystem 404, a terminal interface 412, a storage interface 416, an input/output device interface 414, and a network interface 418, all of which can be communicatively coupled, directly or indirectly, for inter-component communication via a memory bus 403, an input/output bus 408, bus interface unit 407, and an input/output bus interface unit 410.

The computer system 400 contains one or more general-purpose programmable central processing units (CPUs) 402-1, 402-2, and 402-N, herein collectively referred to as the CPU 402. In some embodiments, the computer system 400 contains multiple processors typical of a relatively large system; however, in other embodiments the computer system 400 can alternatively be a single CPU system. Each CPU 402 may execute instructions stored in the memory subsystem 410 and can include one or more levels of on-board cache.

The memory 404 can include a random-access semiconductor memory, storage device, or storage medium (either volatile or non-volatile) for storing or encoding data and programs. In some embodiments, the memory 404 represents the entire virtual memory of the computer system 400 and may also include the virtual memory of other computer systems coupled to the computer system 400 or connected via a network. The memory 404 is conceptually a single monolithic entity, but in other embodiments the memory 404 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 404 also contains a storage controller 130 and a data segment 425.

These components are illustrated as being included within the memory 404 in the computer system 400. However, in other embodiments, some or all of these components may be on different computer systems and may be accessed remotely, e.g., via a network. The computer system 400 may use virtual addressing mechanisms that allow the programs of the computer system 400 to behave as if they only have access to a large, single storage entity instead of access to multiple, smaller storage entities. Although these components are illustrated as being separate entities, in other embodiments some of these components, portions of some of these components, or all of these components may be packaged together.

In an embodiment, the storage controller 130 includes instructions that execute on the processor 402 or instructions that are interpreted by instructions that execute on the processor 402 to carry out the functions as further described in this disclosure. In another embodiment, the storage controller 130 is implemented in hardware via semiconductor devices, chips, logical gates, circuits, circuit cards, and/or other physical hardware devices in lieu of, or in addition to, a processor-based system. In another embodiment, the storage controller 130 includes data in addition to instructions.

Although the memory bus 403 is shown in FIG. 4 as a single bus structure providing a direct communication path among the CPUs 402, the memory subsystem 410, the display system 406, the bus interface 407, and the input/output bus interface 410, the memory bus 403 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 410 and the input/output bus 408 are shown as single respective units, the computer system 400 may, in some embodiments, contain multiple input/output bus interface units 410, multiple input/output buses 408, or both. Further, while multiple input/output interface units are shown, which separate the input/output bus 408 from various communications paths running to the various input/output devices, in other embodiments some or all of the input/output devices may be connected directly to one or more system input/output buses.

The computer system 400 may include a bus interface unit 407 to handle communications among the processor 402, the memory 404, a display system 406, and the input/output bus interface unit 410. The input/output bus interface unit 410 may be coupled with the input/output bus 408 for transferring data to and from the various input/output units. The input/output bus interface unit 410 communicates with multiple input/output interface units 412, 414, 416, and 418, which are also known as input/output processors (IOPs) or input/output adapters (IOAs), through the input/output bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 is a multi-user mainframe computer system, a single-user system, or a server computer or similar device that has little or no direct user interface but receives requests from other computer systems (clients). Further, in some embodiments, the computer system 400 is implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, Components other than or in addition to those shown in FIG. 4 may be present, and the number, type, and configuration of such components may vary.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selectively destroying data on a storage system, the method comprising:
    sanitizing, in response to a wipe command to permanently delete a data segment stored in the storage system, the data segment, wherein the data segment includes an address to blocks where data of the data segment is stored in the storage system;
    marking the address to the blocks as sanitized;
    based on sanitizing the data segment,
        locating a last journal entry for the data segment located in a journal for the storage system, wherein the last journal entry contains information regarding the data segment;
    sanitizing the last journal entry;
    traversing the journal to locate one or more previous journal entries for the data segment; and
    sanitizing the one or more previous journal entries in the journal.

2. The method of claim 1, further comprising:
    determining, prior to sanitizing the data segment, whether the data segment is deduplicated on the storage system;
    based on determining that the data segment is deduplicated,
        determining whether the address points directly to the data segment as a data source address location;
    marking, upon determining that the data segment is the data source address location, the address to the blocks as sanitized;
    migrating the data segment from the data source address location to a reference address location;
    setting the reference address location as a new source address location for the data segment; and
    marking the new source address location such that the mark indicates that new source address requires sanitization when no longer needed.

3. The method of claim 1, further comprising:
    determining, prior to sanitizing the data segment, whether the data segment is deduplicated on the storage system;
    based on determining that the data segment is deduplicated,
        determining whether the address points directly to the data segment as a data source address location;
    marking, upon determining that the data segment is a reference to the data source address location, the address to the blocks as sanitized; and
    marking the data source address location such that the mark indicates that the data source address location requires sanitization when no longer needed.

4. The method of claim 1, wherein sanitizing the data segment comprises:
    overwriting the blocks with random data at least once; and
    marking the data segment as sanitized, wherein reading from the data segment returns causes a zero buffer to be returned.

5. The method of claim 1, further comprising:
    promoting the data segment to a front of a queue for garbage collection.

6. The method of claim 1, further comprising:
    performing, prior to sanitizing the data segment, at least one of address translation and space translation on the data segment, wherein the data segment is compressed on the storage system.

7. The method of claim 1, wherein the wipe command is attached to a SCSI command.

8. A computer-readable medium having instruction stored therein, which when executed by a computer, cause the computer to perform operations, the operations comprising:
    sanitize, in response to a wipe command to permanently delete a data segment stored in the storage system, the data segment, wherein the data segment includes an address to blocks where data of the data segment is stored in the storage system;
    mark the address to the blocks as sanitized;
    based on sanitizing the data segment,
        locate a last journal entry for the data segment located in a journal for the storage system, wherein the last journal entry contains information regarding the data segment;
    sanitize the last journal entry;
    traverse the journal to locate one or more previous journal entries for the data; and
    sanitize the one or more previous journal entries in the journal.

9. The computer-readable medium of claim 8, further comprising:
    determine, prior to sanitizing the data segment, whether the data segment is deduplicated on the storage system;
    based on determining that the data is deduplicated,
        determine whether the address points directly to the data segment as a data source address location;
    mark, upon determining that the data segment is the data source address location, the address to the blocks as sanitized;

migrate the data segment from the data source address location to a reference address location;

set the reference address location as a new source address location for the data segment; and mark the new source address location such that the mark indicates that new source address requires sanitization when no longer needed.

10. The computer-readable medium of claim 8, further comprising:

determine, prior to sanitizing the data segment, whether the data segment is deduplicated on the storage system;

based on determining that the data segment is deduplicated, determine whether the address points directly to the data segment as a data source address location;

mark, upon determining that the data segment is a reference to the data source address location, the address to the blocks as sanitized; and mark the data source address location such that the mark indicates that the data source address location requires sanitization when no longer needed.

11. The computer-readable medium of claim 8, further comprising:

overwrite the blocks with random data at least once; and mark the data segment as sanitized, wherein reading from the data segment causes a zero buffer to be returned.

12. The computer-readable medium of claim 8, further comprising:

promote the data segment to a front of a queue for garbage collection.

13. The computer-readable medium of claim 8, further comprising:

perform, prior to sanitizing the data segment, perform at least one of address translation and space translation on the data segment, wherein the data segment is compressed on the storage system.

14. The computer-readable medium of claim 8, wherein the wipe command is attached to a SCSI command for deletion of data.

15. A system, comprising:

a processor;

a memory to store instructions, which when executed from the memory, cause the processor to perform operations on the system, sanitizing, in response to a wipe command to permanently delete a data segment stored in the storage system, the data segment, wherein the data segment includes an address to blocks where data of the data segment is stored in the storage system;

marking the address to the blocks as sanitized;

based on sanitizing the data segment, locating a last journal entry for the data segment located in a journal for the storage system, wherein the last journal entry contains information regarding the data segment;

sanitizing the last journal entry;

traversing the journal to locate one or more previous journal entries for the data segment; and sanitizing the one or more previous journal entries in the journal.

16. The system of claim 15, wherein the operations further comprise:

prior to sanitizing the data segment, determining whether the data segment is deduplicated on the storage system;

upon determining that the data is deduplicated, determining whether the address points directly to the data segment as a data source address location;

upon determining that the data segment is the data source address location, marking the address to the blocks as sanitized;

migrating the data segment from a data source address location to a reference address location;

setting the reference address location as a new source address location for the data segment; and marking the new source address location such that the mark indicates that new source address requires sanitization when no longer needed.

17. The system of claim 15, wherein the operations further comprise:

prior to sanitizing the data segment, determining whether the data segment is deduplicated on the storage system;

upon determining that the data segment is deduplicated, determining whether the address points directly to the data segment as a data source address location;

upon determining that the data segment is a reference to the data source address location, marking the address to the blocks as sanitized; and marking the data source address location such that the mark indicates that the data source address location requires sanitization when no longer needed.

18. The system of claim 15, wherein the operation of sanitizing the data segment comprises:

overwriting the blocks with random data at least once; and marking the data segment address location as sanitized, wherein reading from the address returns causes a zero buffer to be returned.

19. The system of claim 15, wherein the operations further comprise:

promoting the data segment to the front of a queue for garbage collection.

20. The system of claim 15, wherein the operations further comprise:

prior to sanitizing the data segment, performing at least one of address translation and space translation on the data segment address location, wherein the data segment is compressed on the storage system.

* * * * *